US009858530B2

(12) United States Patent
Pinel et al.

(10) Patent No.: US 9,858,530 B2
(45) Date of Patent: Jan. 2, 2018

(54) GENERATING NOVEL WORK PRODUCTS USING COMPUTATIONAL CREATIVITY

(71) Applicant: International Business Machines Corporation, Armonk, NY (US)

(72) Inventors: Florian Pinel, New York, NY (US); Krishna C. Ratakonda, Yorktown Heights, NY (US); Lav R. Varshney, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 14/592,960

(22) Filed: Jan. 9, 2015

(65) Prior Publication Data

US 2015/0199624 A1  Jul. 16, 2015

Related U.S. Application Data

(60) Provisional application No. 61/928,092, filed on Jan. 16, 2014.

(51) Int. Cl.
*G06N 99/00* (2010.01)
*G06Q 10/06* (2012.01)
*G06K 9/00* (2006.01)

(52) U.S. Cl.
CPC ......... *G06N 99/00* (2013.01); *G06K 9/00496* (2013.01); *G06Q 10/067* (2013.01)

(58) Field of Classification Search
CPC .................. G06N 99/005; G06N 99/00
See application file for complete search history.

(56) References Cited

U.S. PATENT DOCUMENTS

| 8,145,512 B1 | 3/2012 | Henne et al. |
| 8,386,482 B2 | 2/2013 | Gopalakrishnan |
| 2008/0201690 A1 | 8/2008 | Lovisa et al. |

(Continued)

FOREIGN PATENT DOCUMENTS

| CN | 103198296 A | 7/2013 |
| EP | 1571579 A1 | 9/2005 |

(Continued)

OTHER PUBLICATIONS

Y. Ahn et al., "Flavor network and the principles of food pairing", Nature Scientific reports, 2011, 7 pages.*

(Continued)

*Primary Examiner* — Vincent Gonzales
(74) *Attorney, Agent, or Firm* — William H. Hartwell

(57) ABSTRACT

Software that uses machine logic to generate novel work products by combining known work product constituents to create constituent combinations, by performing the following steps: (i) maintaining a constituent data store, the constituent data store including identifying information for a plurality of constituents used to make combination products; (ii) receiving a set of combination preferences relating to a desired type of combination product; and (iii) applying a set of eliminational rules to the set of combination preferences and the plurality of constituents to define a raw set of proposed combination product(s), where each combination product of the raw set of proposed combination product(s) meets all the eliminational rules.

6 Claims, 10 Drawing Sheets

400

```
WHAT KIND OF DISH DO YOU WANT TO MAKE?
DESSERT WITH FLAVORS OF THE EASTERN REGION
DO YOUR CUSTOMERS LIKE SPICY FOODS?
NO
DO YOUR CUSTOMERS LIKE MINT FLAVOR?
YES
TOP COMBINATIONS
1) ICE CREAM, CANDY CANE. SCORE = 90
2) ICE CREAM, CANDY CANE, CINNAMON. SCORE = 82
3) ICE CREAM, CINNAMON. SCORE = 61
4) CANDY CANE, CINNAMON, ALMOND PASTE. SCORE = 60
5) CANDY CANE, CINNAMON. SCORE = 60
```

(56) References Cited

U.S. PATENT DOCUMENTS

2011/0231233 A1* 9/2011 Iannace .................. G06Q 30/02
705/14.13
2011/0271187 A1 11/2011 Sullivan et al.

FOREIGN PATENT DOCUMENTS

| WO | 0004464 A1 | 1/2000 |
| --- | --- | --- |
| WO | 2011005157 A1 | 1/2011 |
| WO | 2011130028 A2 | 10/2011 |

OTHER PUBLICATIONS

N. Singley, "What Not to Pair: Cheese Pairings to Avoid", http://www.thekitchn.com/what-not-to-pair-cheese-pairin-148014, Jun. 1, 2011, accessed Dec. 24, 2016, 3 pages.*

J. Sobecki et al., "Application of Hybrid Recommendation in Web-Based Cooking Assistant", 10th Int'l Conf. on Knowledge-Based Intell. Info. and Eng. Sys., 2006, pp. 979-804.*

Jagmohan et al., "Exploring Application Domains for Computational Creativity", Fifth International Conference on Computational Creativity, Ljubljana, Slovenia, Jun. 9-13, 2014, Grace Period Disclosure document.

Kelley, Kevin, "The Three Breakthroughs That Have Finally Unleashed AI on the World", Wired Insider, Oct. 27, 2014, <http://www.wired.com/2014/10/future-of-artificial-intelligence/>.

Nay, Chris, "See What's Cooking in the Cognitive Kitchen", Building a Smarter Planet. A Smarter Planet Blog, Mar. 6, 2014, <http://asmarterplanet.com/blog/2014/03/cooking-computers.html>.

Pinel et al., "Computational Creativity for Culinary Recipes", CHI 2014, Apr. 26-May 1, 2014, Toronto, Ontario, Canada, ACM 978-1-4503-2474-8/14/04, pp. 439-442, Grace Period Disclosure document.

Shao et al., "Computational Creativity for Personalized Artifact Creation", Wednesday Nov. 12, 2014, 11:00-12:30, <https://informs.emeetingsonline.com/emeetings/formbuilder/clustersessiondtl.asp?csnno=21055&mmnno=260&ppnno=78135>.

Shao et al., "New Developments in Culinary Computational Creativity", Fifth International Conference on Computational Creativity, Ljubljana, Slovenia, Jun. 9-13, 2014.

Shao et al., "Personalization of Product Novelty Assessment via Bayesian Surprise", Sunday, Aug. 3, 2014 : 4:00 PM to 5:50 PM, JSM 2014 Online Program, <http://www.amstat.org/meetings/jsm/2014/onlineprogram/AbstractDetails.cfm?abstractid=311091>.

U.S. Appl. No. 14/587,021 entitled "Computing Personalized Probabilistic Familiarity Based on Known Artifact Data", filed Dec. 31, 2014.

U.S. Appl. No. 61/928,092 entitled "Computational Creativity Process for Generating Novel Work Products", filed Jan. 16, 2014.

Varshney et al., "A Big Data Approach to Computational Creativity", arXiv:1311.1213v1 [cs.CY], Nov. 5, 2013.

* cited by examiner

400

---

WHAT KIND OF DISH DO YOU WANT TO MAKE?

DESSERT WITH FLAVORS OF THE EASTERN REGION

DO YOUR CUSTOMERS LIKE SPICY FOODS?

NO

DO YOUR CUSTOMERS LIKE MINT FLAVOR?

YES

TOP COMBINATIONS
1) ICE CREAM, CANDY CANE. SCORE = 90
2) ICE CREAM, CANDY CANE, CINNAMON. SCORE = 82
3) ICE CREAM, CINNAMON. SCORE = 61
4) CANDY CANE, CINNAMON, ALMOND PASTE. SCORE = 60
5) CANDY CANE, CINNAMON. SCORE = 60

FIG. 4A

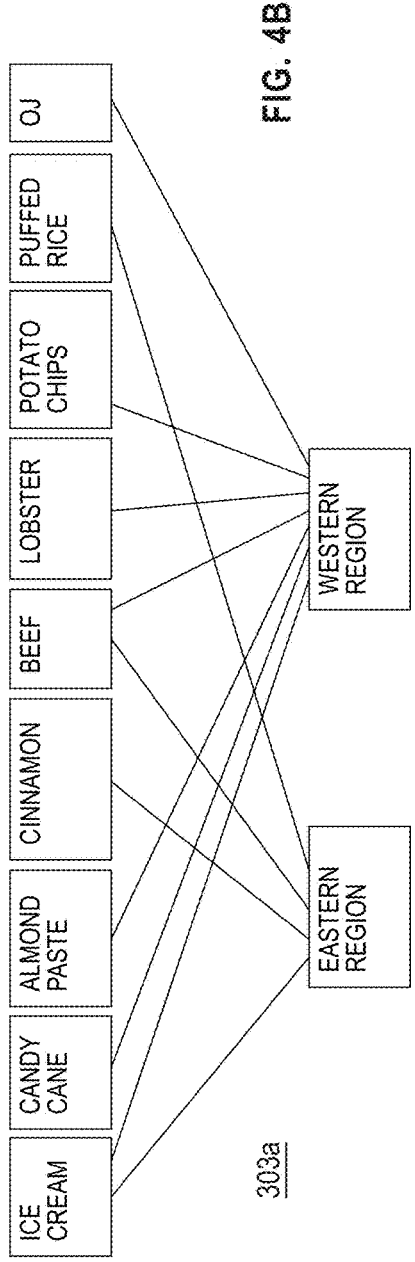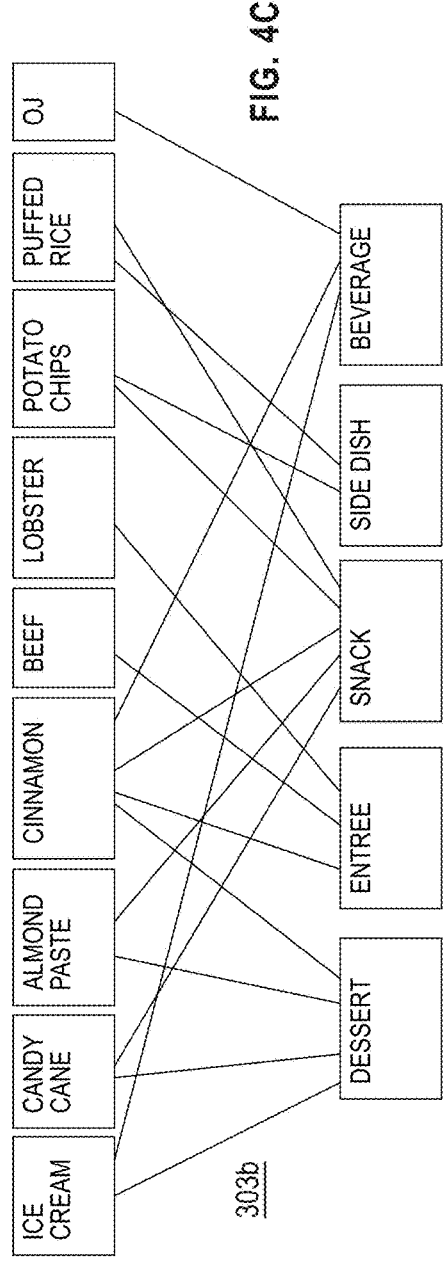

Dish Contents cheese, egg product, dairy, vegetable, seasoning/spice, oil/fat cheese, egg product, dairy, seasoning/spice, vegetable all ingredient types

Recipe Ingredients

846,722,859,929,100 possible recipes

| | Ingredient Type | Frequency | Min | Max |
|---|---|---|---|---|
| ▲ | cheese | 98% | 1 | 2 |
| ▲ | eggproduct | 98% | 1 | 1 |
| ▲ | dairy | 91.8% | 1 | 2 |
| ▲ | seasoning/spice | 83.7% | 1 | 3 |
| ▲ | vegetable | 83.7% | 1 | 3 |
| ▲ | oil/fat | 42.9% | 1 | 2 |
| ▲ | herb | 32.7% | 0 | 0 |
| ▲ | dough | 30.6% | 0 | 0 |
| ▲ | cereal/crop | 28.6% | 0 | 0 |
| ▲ | meat | 24.5% | 0 | 0 |

GENERATING NOVEL WORK PRODUCTS USING COMPUTATIONAL CREATIVITY

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) "Exploring Application Domains for Computational Creativity", Ashish Jagmohan, Ying Li, Nan Shao, Anshul Sheopuri, and Dashun Wang, Fifth International Conference on Computational Creativity, Ljubljana, Slovenia, 9-13 Jun. 2014; and (ii) "Computational Creativity for Culinary Recipes", Florian Pinel and Lay R. Varshney, CHI 2014, Apr. 26-May 1, 2014, Toronto, Ontario, Canada, pp. 439-442.

BACKGROUND OF THE INVENTION

The present invention relates generally to the field of computational creativity, and more particularly to the generation of novel work products.

Computational creativity is known. Computational creativity is the use of computers to enhance human creativity or, in some situations, simulate human creativity. One form of computational creativity is combinatorial creativity, which involves combining pre-existing ideas or objects into novel work products.

SUMMARY

According to an aspect of the present invention, there is a method, computer program product and/or system that performs the following steps (not necessarily in the following order): (i) maintaining a constituent data store, the constituent data store including identifying information for a plurality of constituents used to make combination products; (ii) receiving a set of combination preferences relating to a desired type of combination product; and (iii) applying a set of eliminational rules to the set of combination preferences and the plurality of constituents to define a raw set of proposed combination product(s), where each combination product of the raw set of proposed combination product(s) meets all the eliminational rules.

BRIEF DESCRIPTION OF THE DRAWINGS

FIG. 4A is a screenshot view generated by the first embodiment system;

FIG. 4B is a block diagram showing information that is helpful in understanding the first embodiment system;

FIG. 4C is a block diagram showing information that is helpful in understanding the first embodiment system;

FIG. 8 is a screenshot view generated by the second embodiment system;

DETAILED DESCRIPTION

Figure 1:
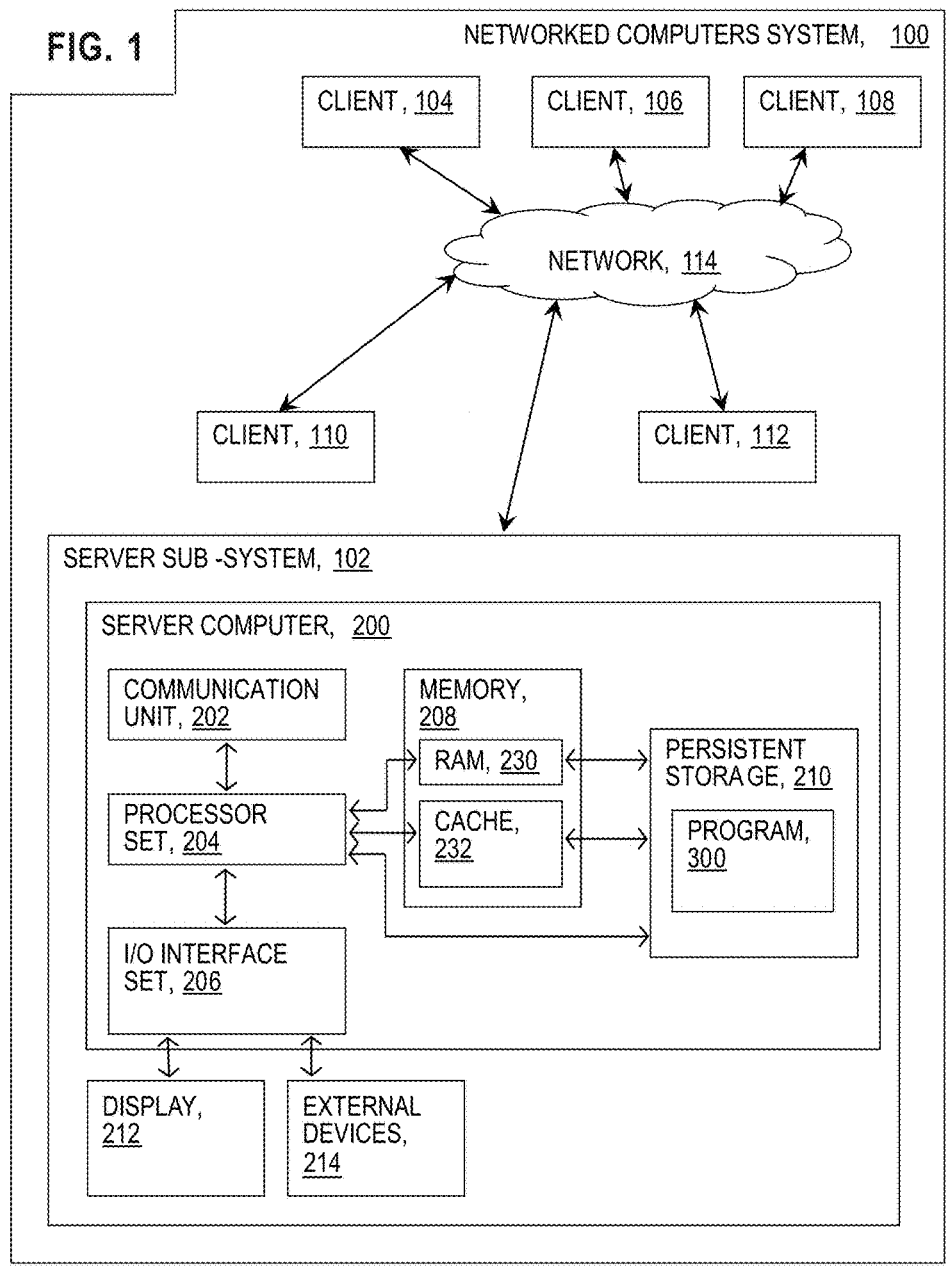
FIG. 1 is a block diagram view of a first embodiment of a system according to the present invention.

Embodiments of the present invention use machine logic to generate novel work products by combining known work product constituents to create constituent combinations. The combinations are then filtered based on various combination preferences and elimination rules. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: sub-system 102; sub-systems 104, 106, 108, 110, 112; communication network 114; computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
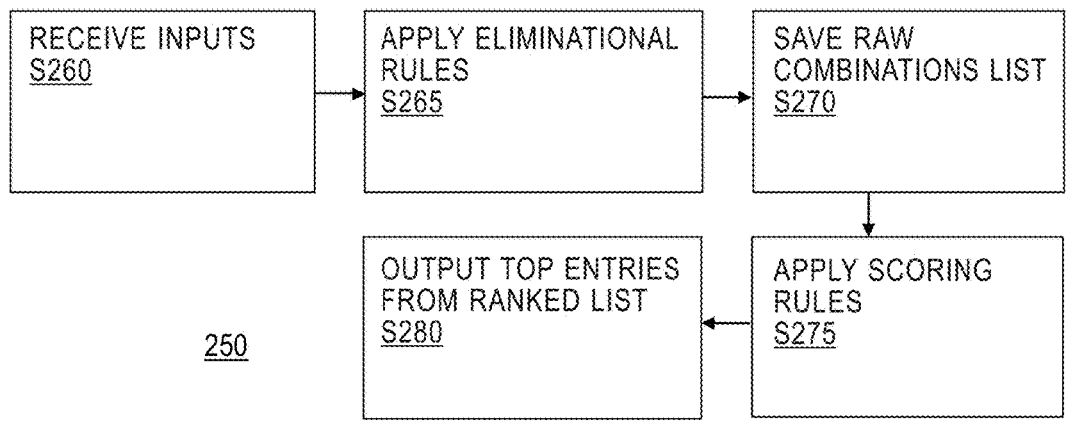
FIG. 2 is a flow chart showing a first embodiment method performed, at least in part, by the first embodiment system.
Figure 3:
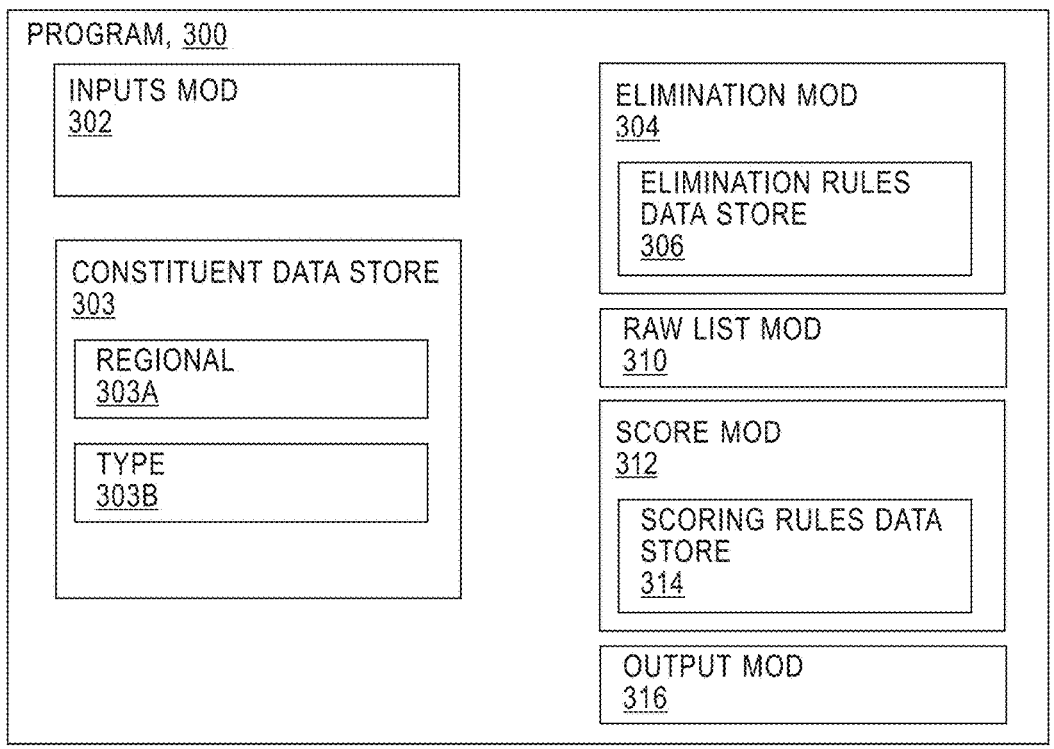
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

The example embodiment discussed in the following paragraphs refers to constituents and combinations of constituents (sometimes also referred to as "combination products" and/or "work products"). Generally speaking, a purpose of method 250 is to generate novel combinations of constituents. As used herein, a constituent may be any item that can be combined with other items to form a combination of items. Although the present embodiment refers to constituents and combinations in the form of "ingredients" and "dishes," some other examples of constituents and their corresponding combinations include: (i) recipe steps and recipes; (ii) perfumatory ingredients and perfumes; (iii) travel destinations and travel itineraries; (iv) grapes and wine; (v) ingredients and formulas for manufactured food products; (vi) parts and manufactured goods; (vii) fabrics and clothing; (viii) clothing and clothing pairings; and/or (ix) words and phrases/sentences.

Processing begins at operation S260, where inputs mod 302 receives inputs from a user. Screenshot 400 (see FIG. 4A) shows the following inputs (or "combination preferences") for the present example embodiment: (i) a desert type dish is desired; (ii) the expected customers (i.e. consumers of dishes) do not like spicy foods; and (iii) the customers do like mint flavor. In this example, the inputs mod will always ask the user what type of dish is desired and will always ask the user whether the customers like spicy foods. The inputs mod is further programmed to ask the user about mint in cases where the user has specified a desert type dish.

Processing proceeds to operation S265 (see FIG. 2), where elimination mod 304 (see FIG. 3) applies elimination rules of elimination rules data store 306 against constituent data store 303 and the inputs received at operation S260. In the present embodiment, the constituents in the constituent data store are categorized by region (as shown in regional constituent data store 303a, see FIG. 4B) and by type (as shown in type constituent data store 303b, see FIG. 4C). However, in other embodiments, the constituent categories may include at least one of the following types of categories: food dish ethnicity, special dietary needs, nutritional, time of day typically eaten, holiday occasion, color, texture, serving temperature, expense, seasonality, famous chef associated with food dish, era of origination of the food dish, aroma and/or flavor.

A partial list of elimination rules, for the present example, is as follows:

Elimination Rule 1 (ER1). If a desert type dish is desired, then at least one constituent must come from the desert type category. In this example, and as best understood with reference to FIG. 4C, the desert type constituents are ice cream, candy cane, almond paste, and cinnamon. This means that the proposed combinations must all include at least one of these constituents.

ER2. If a desert type dish is desired, then eliminate any constituent having "entrée" as its only type category. In this example, as best understood with reference to FIG. 4C, this eliminates the constituents beef and lobster because they belong only to the "entrée" type category and no other type category.

ER3. If a desert type dish is desired, then eliminate all constituents having "side dish" as a type category. In this example, as best understood with reference to FIG. 4C, this eliminates the constituents potato chips and puffed rice because they belong to the "side dish" type.

ER4. If a desert type dish is desired, then eliminate any combination having fewer than two constituents.

ER5. If ice cream is one of the constituents of a combination, then eliminate any combinations that further include any one of the following: orange juice and/or almond paste.

Processing proceeds to step S270, were raw list mod 310 saves a raw list of possible combinations of ingredients. Given the constituents of FIGS. 4B and 4C, and the elimination rules set forth above, the raw list of combinations in the present embodiment is: (i) candy cane, almond paste, cinnamon, orange juice; (ii) candy cane, cinnamon, orange juice; (iii) candy cane, almond paste, orange juice; (iv) candy cane, almond paste, cinnamon; (v) almond paste, cinnamon, orange juice; (vi) candy cane, almond paste; (vii) candy cane, cinnamon; (viii) candy cane, orange juice; (ix) almond paste, cinnamon; (x) almond paste, orange juice; (xi) cinnamon, orange juice; (xii) ice cream, candy cane, cinnamon; (xiii) ice cream, candy cane; and (xiv) ice cream, cinnamon. It is noted that this list of possible combinations is much, much smaller than it would be if the eliminational rules of operation S265 had not been applied.

Processing proceeds to operation S275, where score mod 312 applies scoring rules of scoring rules data store 314 against the inputs received at operation S260, constituents data store 303, and each of the combinations of the raw list of possible combinations saved at operation S270. The scoring rules for this example will not be set forth in detail, but the scoring rules assign a scalar score to each combination based on how suitable it is determined to be by the machine logic of mod 312. The scoring rules may be selectively applicable based upon: (i) combination identity (for example, any combination including candy cane and orange juice has its score multiplied by 0.1); (ii) constituent identity (for example, any combination including puffed rice has ten points deducted from its score); (iii) constituent category (for example, any combination with at least one ingredient belonging to more than one regional category (see FIG. 4B) will have its score squared); (iv) user inputs (for example, if "dislike spicy" is an input then any combination containing cinnamon will have 7 points deducted from its score); and/or (v) any other factors (for example, on Mondays, all combinations having exactly 3 constituents get a bonus point). A further discussion of scoring rules (also referred to as "metrics") is included in the Further Comments and/or Embodiments sub-section of this Detailed Description.

Processing proceeds to operation S280, where output mod 316 outputs the top five ranked combinations in decreasing order of score. This is shown in screenshot 400 of FIG. 4A in relation to the present example embodiment. Some general observations on the scoring are as follows: (i) combinations with ice cream ranked relatively high because ice cream belongs to the Eastern Region (which was one of the inputs) and because it is a desert type constituent (again, as indicated by the preferences; and (ii) cinnamon had a mixed impact on its combinations because it belongs to the Eastern Region (consistent with the inputs), but it is considered somewhat spicy (somewhat inconsistent with the inputs). Once the ranked combinations are output, the information may be used in a wide variety of ways. In the present example embodiment, for example, a user may use the generated list of ingredient combinations to create a recipe for combining ice cream with a candy cane, or combining a candy cane with cinnamon.

III. Further Comments and/or Embodiments

Some embodiments of the present invention recognize the following facts, potential problems and/or potential areas for improvement with respect to the current state of the art: (i) prior methods do not explain how constituent combinations are created; and (ii) prior methods do not narrow down combinatorial possibilities using constituent bills (see below).

Some embodiments of the present invention utilize a knowledge base of work products (also referred to as "combination products") and work product constituents in a particular domain or group of domains (discussed further, below). Work product constituents are used to create work products (that is, work products are made of one or more constituents). As such, in many embodiments, by providing a large dataset of known constituents (as well as inspirational examples of known work products), the knowledge base is able to assist in the generation of new work products. Work products and constituents typically include properties that can be used to evaluate their desirability to a user. Some simple examples of possible properties include chemical composition (for culinary ingredients) and cost of materials (in manufacturing).

Figure 5A:
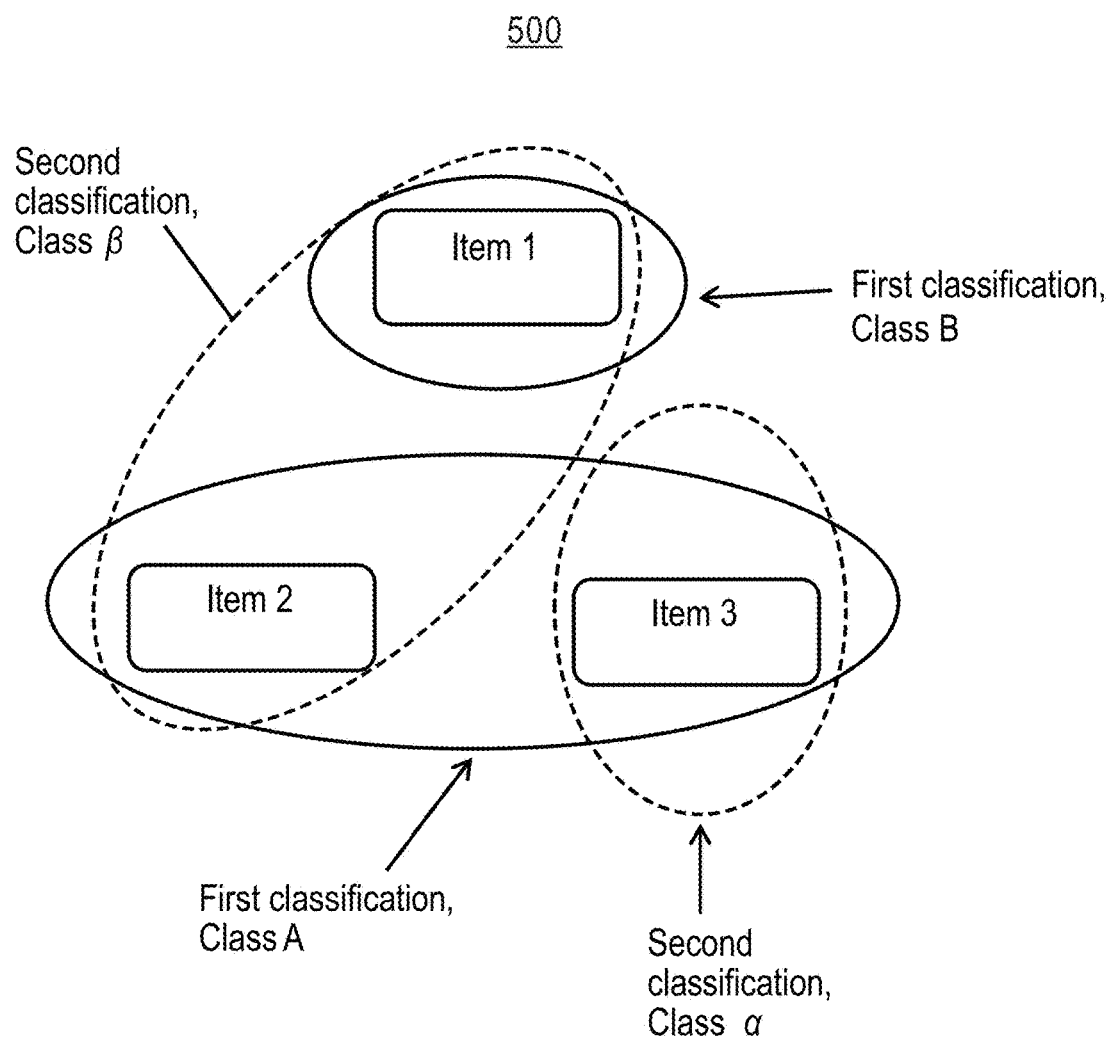
FIG. 5A is a diagram showing information that is helpful in understanding a second embodiment system of the present invention.

In some embodiments of the present invention, the knowledge base organizes work products and constituents into categories (where the category names are also sometimes referred to as "classification information" and the hierarchical structure of the categories are sometimes referred to as "relationship information"). Diagram 500 (see FIG. 5A) is an example representation of work products/constituents ("items") and their corresponding categories. As shown in FIG. 5A, items can be included in multiple categories, thereby allowing for complex relationships to be created between items.

Figure 5B:
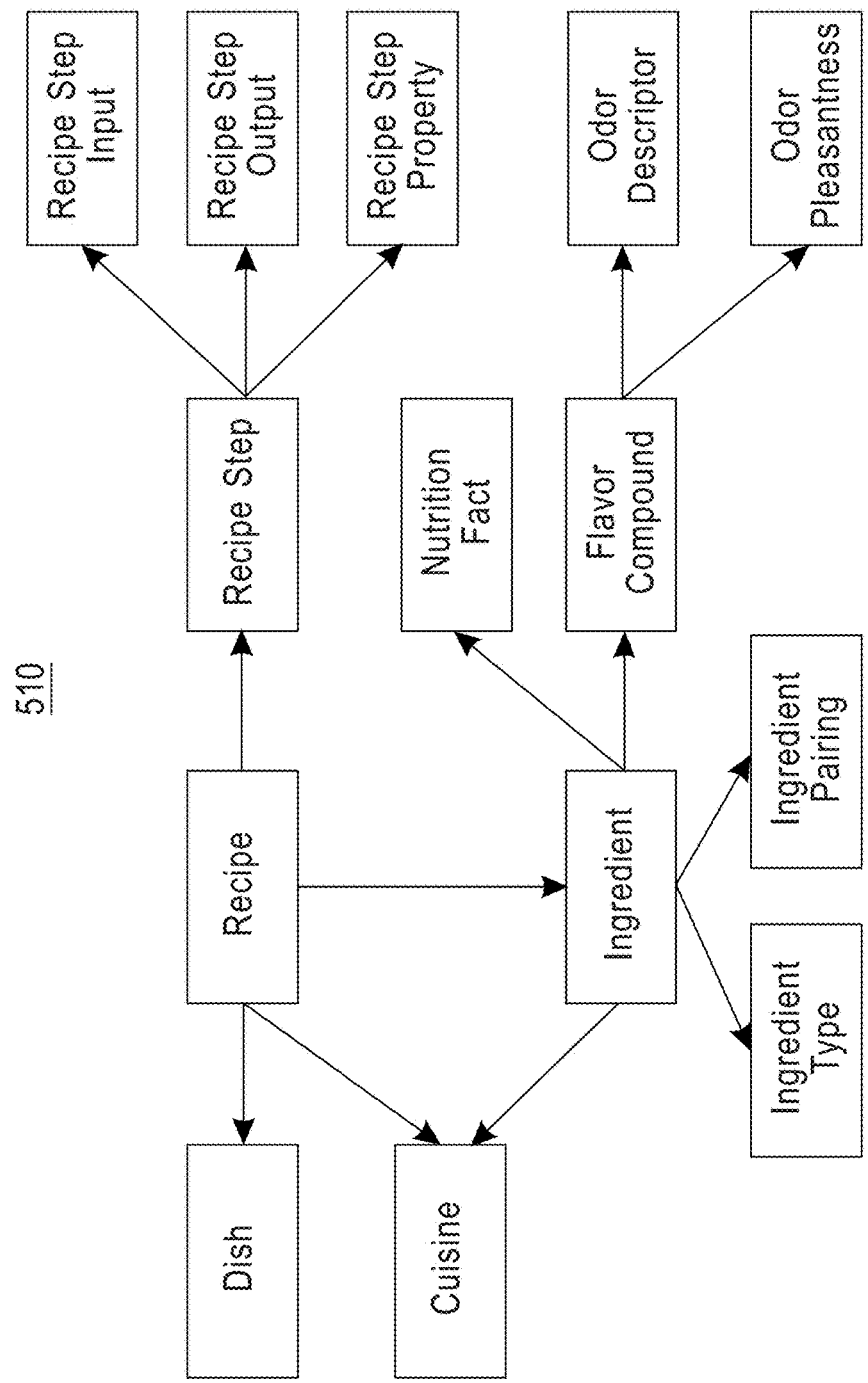
FIG. 5B is a block diagram showing information that is helpful in understanding the second embodiment system.
Figure 5C:
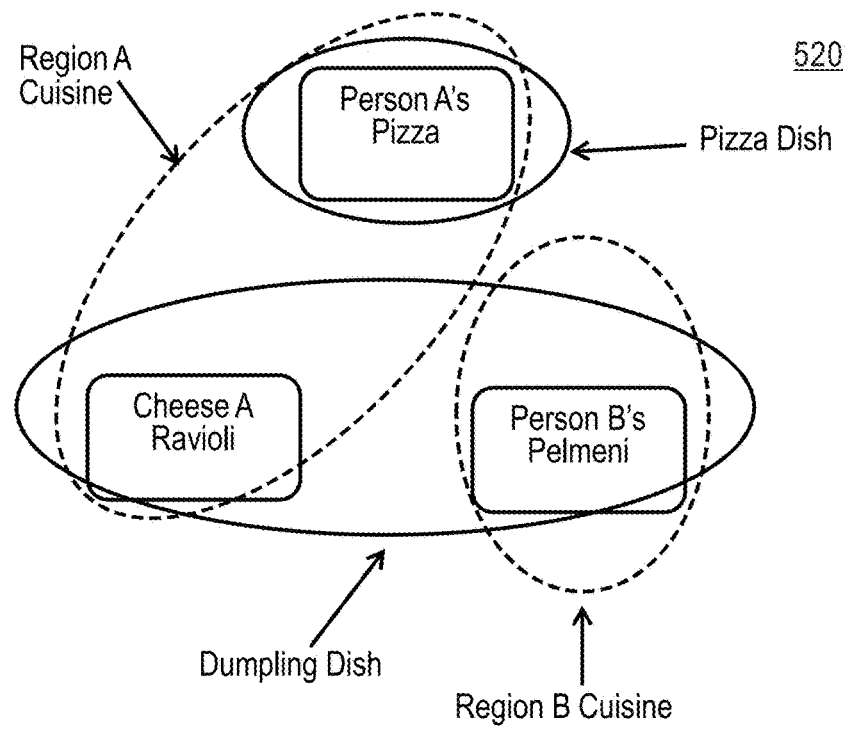
FIG. 5C is a diagram showing information that is helpful in understanding the second embodiment system.
Figure 5D:
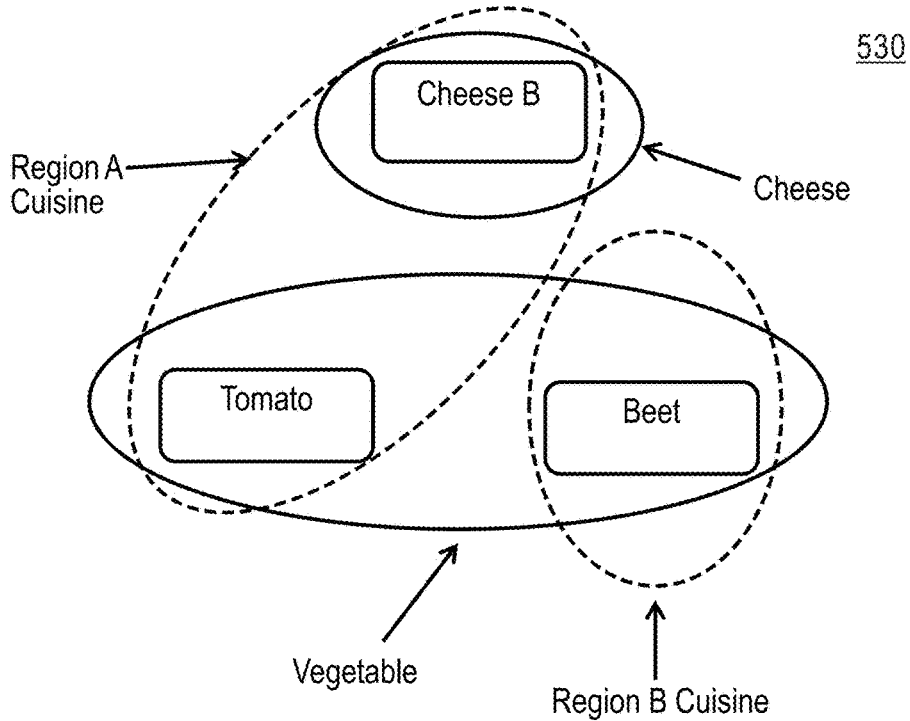
FIG. 5D is a diagram showing information that is helpful in understanding the second embodiment system.

In one example embodiment according to the present invention, the knowledge base includes work products of "recipes" and work product constituents of "ingredients" in the domain of "food". Diagram 510 (see FIG. 5B) depicts recipes and ingredients in relation to their corresponding properties, categories, and relationships. Referring more specifically to the same example embodiment, diagram 520 (see FIG. 5C) shows recipes ("Person A's Pizza", "Cheese A Ravioli", and "Person B's Pelmeni") organized by cuisine ("Region A Cuisine" and "Region B Cuisine") and dish ("Pizza Dish" and "Dumpling Dish"). Similarly, diagram 530 (see FIG. 5D) shows ingredients ("Cheese B", "Tomato", and "Beet") organized by cuisine ("Region A Cuisine" and "Region B Cuisine") and ingredient type ("Cheese" and "Vegetable").

Figure 6:
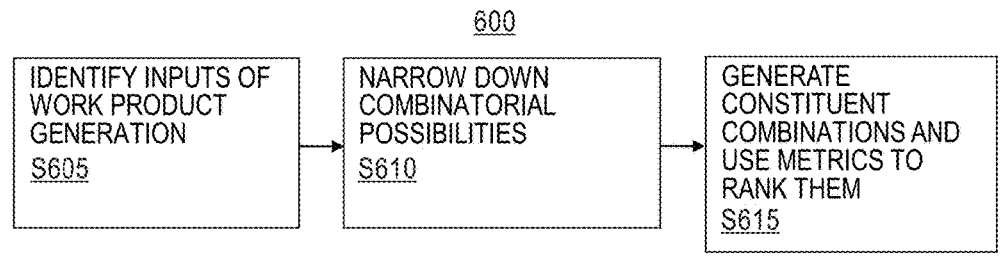
FIG. 6 is a flow chart showing a second embodiment method performed, at least in part, by the second embodiment system.

A method for using computational creativity to generate novel work products is depicted in flow chart 600 (see FIG. 6). Processing begins with step S605, where method 600 identifies the inputs of work product generation. In this step, a user selects inputs that serve as the starting point for the work product to be created. In other words, in this step, the user selects the requirements and/or parameters for his desired work product. A wide variety of potential inputs may be used, including, for example, target work product categories and/or key work product constituents. Furthermore, the selection of one input may influence the choice of other inputs, and some inputs may be conditional on other inputs.

Figure 7:
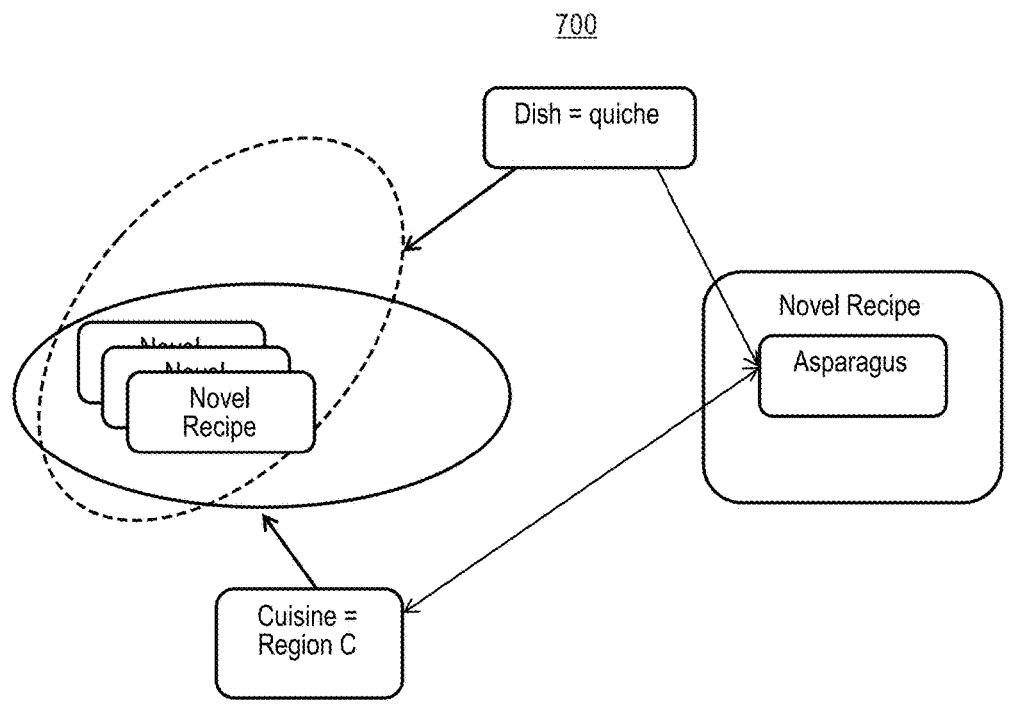
FIG. 7 is a diagram showing information that is helpful in understanding the second embodiment system.

Referring again to the present example embodiment, in this example, the user chooses as inputs a "dish" of "quiche" (which is a category of recipe work products in the domain of food) and a "cuisine" of "Region C" (which is, again, a category of recipe work products in the domain of foods). In plainer words, the user selects inputs indicating that he would like to generate a quiche recipe in the style of Region C cuisine. Diagram 700 (see FIG. 7) shows a representation of this selection. Additionally, in this example, method 600 determines, based on the inputs of "quiche" and "Region C," that quiche dishes and Region C cuisine are categories that include work products that include the constituent of "asparagus". Based on this determination, method 600 recommends to the user that asparagus be included as an input (as shown in FIG. 7), and, in this example, the user decides to choose "asparagus" as a further input for the process of determining the new work product to be created.

Processing proceeds to step S610 (see FIG. 6), where method 600 narrows down the combinatorial possibilities based on the inputs. Stated another way, in this step, method 600 uses the identified inputs to reduce the number of possible constituent combinations available to generate the new work product. As a result, one or more constituent bills (that is, itemized lists of some remaining available constituent categories) are created, along with optional quantity indications. Screenshot 800 (see FIG. 8) depicts a constituent bill according to the present example embodiment, based on the selected inputs of "quiche", "Region C", and "asparagus". The constituent bill detailed in screenshot 800 includes dishes that contain the following constituents: (i) cheese; (ii) egg product; (iii) dairy; (iv) vegetable; (v) seasoning/spice; and (vi) oil/fat. Also, as shown in screenshot 800, additional constituent bills may be presented to the user containing different variations of available constituents. As shown in screenshot 800, in this embodiment, the following constituent bills are also included: (i) a constituent bill including cheese, egg product, dairy, seasoning/spice, and vegetable; and (ii) a constituent bill including all ingredient types. The constituent bills generated by method 600 may be further edited by a user in order to customize the results based on the user's preferences.

Figure 9A:
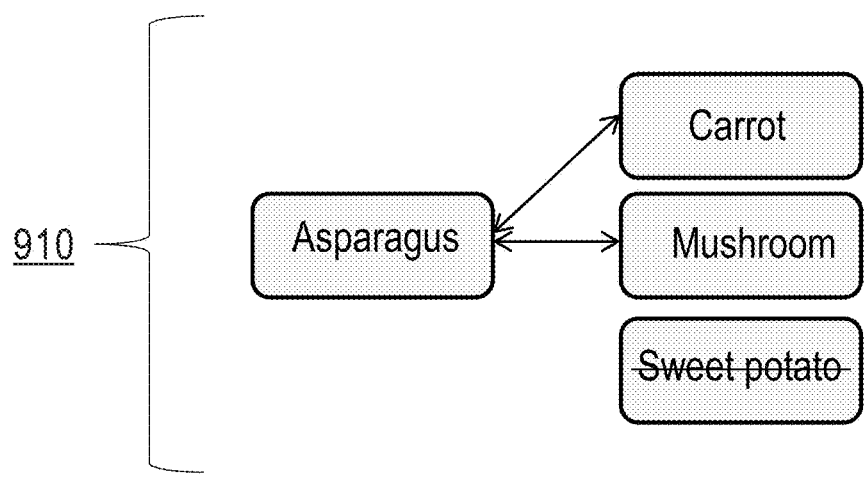
FIG. 9A is a block diagram showing information that is helpful in understanding the second embodiment system.
Figure 9B:
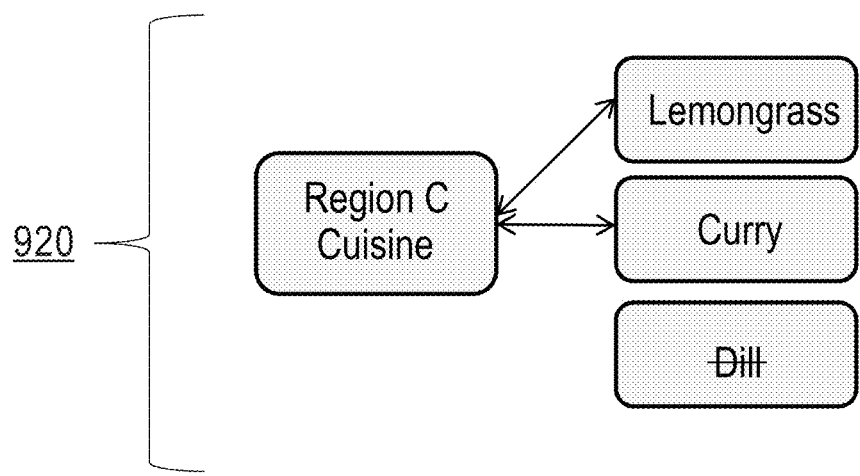
FIG. 9B is a block diagram showing information that is helpful in understanding the second embodiment system.

Referring still to step S610, in addition to creating constituent bill(s), method 600 also determines a subset of constituents that meet the requirements indicated by the identified inputs. Referring to the present example embodiment, diagram 910 (see FIG. 9A) depicts the process of determining ingredients that are compatible with asparagus (which is one of the previously identified inputs). In this example, based on information/properties contained in the knowledge base, method 600 determines that carrots and mushrooms are compatible with asparagus, and that sweet potatoes are not compatible with asparagus. Similarly, as shown in diagram 920 (see FIG. 9B), method 600 determines that lemongrass and curry are compatible with Region C cuisine, while dill is not compatible with Region C cuisine. This example is not meant to be limiting, however, as other methods (that is, methods not based on constituent compatibility) may be used. For example, in another embodiment, constituents may be narrowed down based on the user's dietary restrictions.

Processing proceeds to step S615, where method 600 generates constituent combinations and uses metrics to rank them. This step begins by generating all possible remaining combinations of constituents, after having narrowed down the combinatorial possibilities in the previous step. Next, method 600 computes metrics (sometimes also referred to as "scoring rules") for each combination. Some examples of typical metrics include: (i) price; (ii) ease of manufacture; (iii) customer satisfaction prediction; (iv) quality estimation; and/or (v) novelty/surprise. After metrics are computed, the combinations are then ranked based on the metrics. In some embodiments, the ranking optionally includes a weighted combination of all metric values. Once the combinations have been ranked, processing for method 600 completes, producing a ranked list of work products.

Method 600 is adapted to generate novel work products for a wide variety of possible domains and/or categories. For example, in addition to food, the following domains may be used: (i) electronic circuits; (ii) complex travel itineraries; (iii) fashion; and/or (iv) scientific discovery (such as scientific hypotheses). In fact, in some embodiments of the present invention, method 600 may even generate work products that span multiple domains. The following examples demonstrate how method 600 can operate in a few of the myriad possible applicable domains.

In one example embodiment (similar to the example embodiment discussed above), the domain of "culinary recipes" is provided. In this embodiment, work products are "recipes," and constituents are "food ingredients". Ingredients are classified by ingredient type and cuisine, and recipes are classified by dish and cuisine. Referring to method 600, the inputs identified in step S605 include the following: (i) key ingredient; (ii) cuisine; (iii) dish; and (iv) dietary restrictions. Proceeding to step S610, combinatorial possibilities are narrowed as follows: (i) the selected dish input (such as "quiche") reduces the possible ingredient type combinations; (ii) the selected cuisine (such as "Region C") and key ingredient (such as "asparagus") inputs reduce the ingredients that can be paired in any proposed combination work product; and (iii) the selected dietary restriction inputs reduce the available constituent selections for any new proposed combination work product. Once the combinatorial possibilities have been narrowed, step S615 ranks the remaining combinations according to the following metrics: (i) surprise; (ii) pleasantness; (iii) chemical pairing; (iv) price; and (v) nutritional value.

In another example embodiment, the domain of "fragrances" is provided. In this embodiment, work products are "fragrances," and constituents are "perfumery ingredients". Ingredients are classified by ingredient type (such as top note, middle note, base note, and/or solvent) and olfactive family (such as floral, woody, and/or leather). Fragrances are classified by market segment and product type (such as perfume or cologne). Referring to method 600, the inputs identified in step S605 in this embodiment include the following: (i) market segment; (ii) product type; and (iii) key olfactive family. Proceeding to step S610, combinatorial possibilities are narrowed as follows: (i) the product type input reduces the possible ingredient type combinations; and (ii) the market type and key olfactive family inputs reduce the ingredients that can be paired. Once the combinatorial possibilities have been narrowed, step S615 ranks the remaining combinations according to the following metrics: (i) surprise; (ii) pleasantness; (iii) price; (iv) diffusivity; and (v) longevity.

In yet another example embodiment, the domain of "manufactured food products" is provided. In this embodiment, work products are "formulas for manufactured food products," and constituents are "food manufacturing ingredients". Ingredients are classified by ingredient type (such as chemicals, oils/extracts, dehydrated vegetables, and spices) and cost. Food products are classified by market segment, product type (such as gravy mix or spice blend), and flavor profile (such as mushroom or pasta). Referring to method 600, the inputs identified in step S605 in this embodiment include the following: (i) market segment (including target price range); (ii) product type; and (iii) flavor profile. Proceeding to step S610, combinatorial possibilities are narrowed as follows: (i) the product type input reduces possible ingredient type combinations; and (ii) the cost and flavor profile inputs reduce the ingredients that can be paired. Once the combinatorial possibilities have been narrowed, step S615 ranks the remaining combinations according to the following metrics: (i) surprise; (ii) pleasantness; (iii) price; and (iv) emotions.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   maintaining a constituent data store, the constituent data store including identifying information for a plurality of constituents used to make combination products, the constituent data store further including constituent category information identifying one or more constituent categories respectively corresponding to each of the constituents in the plurality of constituents;
   receiving a set of combination preferences from a user, the combination preferences relating to a desired type of combination product;
   applying a set of eliminational rules to the set of combination preferences and the plurality of constituents to define a raw set of proposed combination products, where each combination product of the raw set of proposed combination products meets all the eliminational rules, and where at least one of the eliminational rules eliminates a candidate combination product from a plurality of combination products for inclusion in the raw set of proposed combination products based on the constituent category of at least one of the constituents in the candidate combination product;
   applying a set of scoring rules to the set of combination preferences and the plurality of constituents to define a score for each of the combination products of the raw set of proposed combination products, where the scoring rules include one or more scoring rules for amount of surprise of the combination products and one or more scoring rules for amount of pleasantness of the combination products;
   determining a ranked set of combination products including at least some of the raw set of proposed combination products, with a ranking of the ranked set of combination products being based upon respective scores of the combination products of the ranked set of combination products; and
   outputting the ranked set of combination products to the user;
   wherein:
   the constituents respectively correspond to food ingredients;
   the combination products respectively correspond to food dishes, with each food dish being made from food ingredients; and
   the constituent categories include at least one of the following types of categories: food dish ethnicity, special dietary needs, nutritional, time of day typically eaten, holiday occasion, color, texture, serving temperature, expense, seasonality, famous chef associated with food dish, era of origination of the food dish, aroma and/or flavor.

2. The method of claim 1 wherein:
   at least one of the scoring rules scores a candidate combination product from a plurality of combination products for inclusion in the raw set of proposed combination products based on the constituent category of at least one of the constituents in the candidate combination product.

3. A computer program product comprising a computer readable storage medium having stored thereon:
program instructions programmed to maintain a constituent data store, the constituent data store including identifying information for a plurality of constituents used to make combination products, the constituent data store further including constituent category information identifying one or more constituent categories respectively corresponding to each of the constituents in the plurality of constituents;
program instructions programmed to receive a set of combination preferences from a user, the combination preferences relating to a desired type of combination product;
program instructions programmed to apply a set of eliminational rules to the set of combination preferences and the plurality of constituents to define a raw set of proposed combination products, where each combination product of the raw set of proposed combination products meets all the eliminational rules, and where at least one of the eliminational rules eliminates a candidate combination product from a plurality of combination products for inclusion in the raw set of proposed combination products based on the constituent category of at least one of the constituents in the candidate combination product;
program instructions programmed to apply a set of scoring rules to the set of combination preferences and the plurality of constituents to define a score for each of the combination products of the raw set of proposed combination products, where the scoring rules include one or more scoring rules for amount of surprise of the combination products and one or more scoring rules for amount of pleasantness of the combination products;
program instructions programmed to determine a ranked set of combination products including at least some of the raw set of proposed combination products, with a ranking of the ranked set of combination products being based upon respective scores of the combination products of the ranked set of combination products; and
program instructions programmed to output the ranked set of combination products to the user;
wherein:
the constituents respectively correspond to food ingredients;
the combination products respectively correspond to food dishes, with each food dish being made from food ingredients; and
the constituent categories include at least one of the following types of categories: food dish ethnicity, special dietary needs, nutritional, time of day typically eaten, holiday occasion, color, texture, serving temperature, expense, seasonality, famous chef associated with food dish, era of origination of the food dish, aroma and/or flavor.

4. The computer program product of claim 3, wherein:
at least one of the scoring rules scores a candidate combination product from a plurality of combination products for inclusion in the raw set of proposed combination products based on the constituent category of at least one of the constituents in the candidate combination product.

5. A computer system comprising:
a processor(s) set; and
a computer readable storage medium;
wherein:
the processor set is structured, located, connected and/or programmed to run program instructions stored on the computer readable storage medium; and
the program instructions include:
program instructions programmed to maintain a constituent data store, the constituent data store including identifying information for a plurality of constituents used to make combination products, the constituent data store further including constituent category information identifying one or more constituent categories respectively corresponding to each of the constituents in the plurality of constituents;
program instructions programmed to receive a set of combination preferences from a user, the combination preferences relating to a desired type of combination product;
program instructions programmed to apply a set of eliminational rules to the set of combination preferences and the plurality of constituents to define a raw set of proposed combination products, where each combination product of the raw set of proposed combination products meets all the eliminational rules, and where at least one of the eliminational rules eliminates a candidate combination product from a plurality of combination products for inclusion in the raw set of proposed combination products based on the constituent category of at least one of the constituents in the candidate combination product;
program instructions programmed to apply a set of scoring rules to the set of combination preferences and the plurality of constituents to define a score for each of the combination products of the raw set of proposed combination products, where the scoring rules include one or more scoring rules for amount of surprise of the combination products and one or more scoring rules for amount of pleasantness of the combination products;
program instructions programmed to determine a ranked set of combination products including at least some of the raw set of proposed combination products, with a ranking of the ranked set of combination products being based upon respective scores of the combination products of the ranked set of combination products; and
program instructions programmed to output the ranked set of combination products to the user;
wherein:
the constituents respectively correspond to food ingredients;
the combination products respectively correspond to food dishes, with each food dish being made from food ingredients; and
the constituent categories include at least one of the following types of categories: food dish ethnicity, special dietary needs, nutritional, time of day typically eaten, holiday occasion, color, texture, serving temperature, expense, seasonality, famous chef associated with food dish, era of origination of the food dish, aroma and/or flavor.

6. The computer system of claim 5, wherein:
at least one of the scoring rules scores a candidate combination product from a plurality of combination products for inclusion in the raw set of proposed combination products based on the constituent category of at least one of the constituents in the candidate combination product.

* * * * *